Sept. 16, 1969     EISUKE SUGAHARA     3,467,397

OIL SCRAPING RING COMBINED WITH COILED EXPANDER

Filed March 13, 1968

United States Patent Office 3,467,397
Patented Sept. 16, 1969

3,467,397
OIL SCRAPING RING COMBINED WITH
COILED EXPANDER
Eisuke Sugahara, Tokyo, Japan, assignor to Nippon
Piston Ring Co., Ltd., Tokyo, Japan
Filed Mar. 13, 1968, Ser. No. 712,651
Int. Cl. F16j 9/04; F16l 9/06
U.S. Cl. 277—139
8 Claims

ABSTRACT OF THE DISCLOSURE

This invention has a feature of an oil scraping ring having a coiled expander combined therewith and the sliding face of said oil scraping ring against the cylinder face is covered by chrome plating and thermoplastic or thermo-setting resin is coated on said chrome-plated face thereby inhibiting possible mal effects such as scuffing and enhancing wear resistivity of said sliding face.

The present invention relates to an oil scraping ring used in an internal combustion engine and more particularly to such oil scraping ring having a coiled expander combined in an inside peripheral groove formed on the back of said scraper ring.

Recently, the compression ratio, operating load and rotational frequency of an internal combustion engine are being steadily enlarged, with a consequent result of increasing consumption of lubricating oil. To cope with such undesirable tendency, attempts have been made to combine an expander such as a coiled expander on the back of the oil scraping ring so as to enhance surface pressure of the oil scraping ring thereby to reduce consumption of lubricating oil and to assure appropriate oil control. The present invention is intended to provide an attainment of such object.

In a conventional coiled expander-combined oil scraping ring assembly, the oil-intake openings are small in area as compared with those in an ordinary oil scraping ring and also the presence of a coiled expander at the back of the oil-intake openings adversely affects circulation of lubricating oil. Further, when lubricating oil passes the coiled expander, carbon residue contained in lubricating oil is deposited on the expander, thus deteriorates oil passage. Still further, provision of a coiled expander on the back of the oil scraping ring gives rise to early wear of the inside peripheral groove of the ring and also wear of the coiled expander itself, and such wear results in debilitating tension of the oil scraping ring so that appropriate surface pressure is not imparted, thus consequently increasing consumption of lubricating oil. To provide wear resistance to the piston ring, it has conventionally been practiced to apply chrome plating on the sliding face of the piston. Although chrome plating is highly effective for providing wear resistance, it is inferior in its initial fit due to its high hardness.

The present invention is designed to eliminate these defects and to better initial fit of the oil scraping ring.

It is therefore an object of the present invention to provide an oil scraping ring having a coiled expander combined therewith, in which chrome plating is applied on the sliding face of the oil scraping ring against the cylinder face and thermoplastic or thermo-setting resin is coated on the chrome-plated face thereby to stabilize and accomplish in a short time initial fit of the oil scraping ring, thus inhibiting possible mal effects such as scuffing and enhancing wear resistivity of said sliding face.

It is another object of the present invention to provide an oil piston scraping combined with an expander, in which the sliding face of the oil ring, lower part of the jaw and inner walls of the oil-intake openings are coated with thermoplastic or thermo-setting resin thereby to reduce flow resistance of lubricating oil on the oil scraping ring surface to improve oil circulation, thus inhibiting deposition of carbon residue.

It is still another object of the present invention to provide an oil scraping ring combined with an expander, in which the oil-intake openings of the oil scraping ring are tapered off inwardly so as to improve coherency of coating of thermoplastic or thermo-setting resin and to uniformalize thickness of the coating film.

It is yet another object of the present invention to provide an oil scraping ring combined with an expander, in which chrome plating is applied to the inside peripheral groove on the back face of the oil scraping ring contacted with the coiled expander thereby to inhibit wear otherwise caused by contact with the coiled expander.

It is an additional object of the present invention to provide an oil scraping ring combined with a coiled expander, in which chrome plating is applied over the entire external periphery of the coiled expander contacted with the inner peripheral groove on the back of the oil scraping ring and additionally thermoplastic of thermo-setting resin is coated over the chrome-plated face thereby to reduce flow resistance of lubricating oil and to inhibit choking of the coiled expander, thus improving wear resistance.

Now, a preferred embodiment of the present invention will be described with reference to the accompanying drawings, in which.

Figure 2:
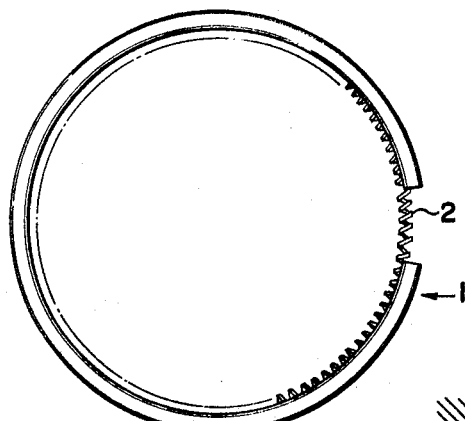
FIG. 2 is a plan view thereof.
Figure 1:
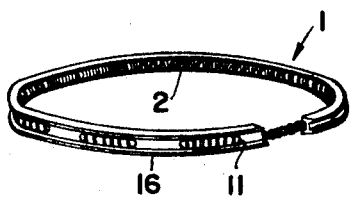
FIG. 1 is a perspective view of an oil scraping ring of the present invention.
Figure 3:
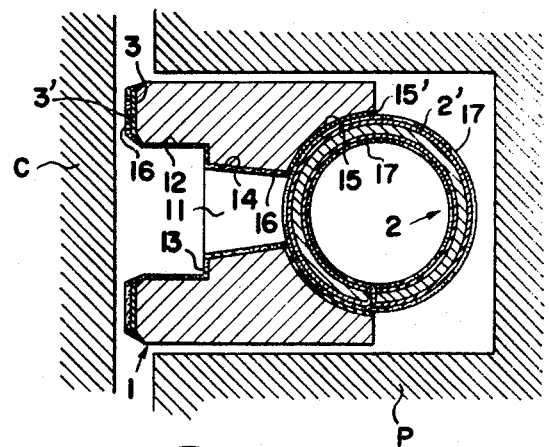
FIG. 3 is an enlarged longitudinal sectional view illustrating a condition in which the device of the present invention is mounted to a piston in a cylinder.

Referring to FIGS. 1 to 3, there is shown an oil scraping ring denoted generally by numerical sign 1, said ring being placed in grooves in a piston (P) reciprocating in a cylinder (C). Said oil scraping ring 1 is annular and comprises a plurality of oil intake openings 11 formed at fixed intervals around the periphery of said ring. Said oil intake openings 11 each comprise a sliding face 3, a lower part 12 of the jaw, a stepped portion 13, an inner portion 14 slightly tapered inwardly (with an inclination of about 10 degrees or less) and an inner peripheral groove 15. A chrome-plated layer 3' (0.03 to 0.15 mm. in thickness) and a similarly plate layer 15' (0.002 to 0.03 mm. in thickness) are formed respectively on said sliding face 3 and on the surface of said inner peripheral groove 15. Additionally, thermoplastic or thermosetting resin coating 16 (for example polytetrafluoroethylene coating with a thickness of 0.002 to 0.01 mm.) is formed on the surfaces of the chrome-plated layer 3' on the sliding face 3, of the lower part 12 of the jaw, of the stepped portion 13 and of the inner portion 14.

Figure 4:
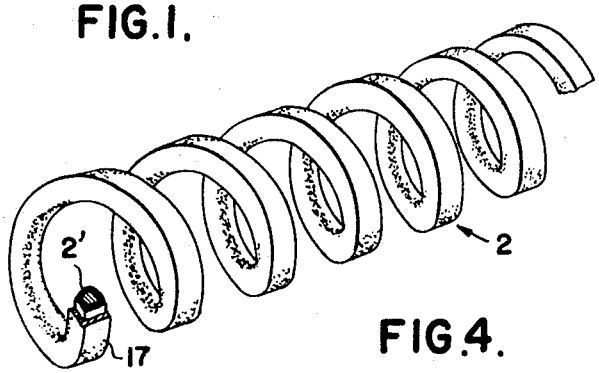
FIG. 4 is a perspective view of the coiled expander composing a part of the present invention.

It will also be seen that a coiled expander 2 is provided in abutted relation to the inner peripheral groove 15 of the oil ring 1. Said coiled expander 2, as shown in FIG. 3 and particularly in FIG. 4, is coated over the entire peripheral surface thereof with a chrome plated layer 2' (0.01 to 0.05 mm. in thickness) which is in turn coated with a thermoplastic or thermo-setting resin layer 17 (0.002 to 0.01 mm. in thickness).

The oil scraping ring used in the present invention is made of "iron-based metals" which include cast iron and steel. These metals comprise, for example, the following components:

| T.C. | Si | Mn | P | S | B |
|---|---|---|---|---|---|
| 3.50–4.00 | 2.00–3.00 | 0.40–1.00 | 0.20–0.60 | Below 0.10 | |
| 3.50–4.00 | 2.00–3.00 | 0.40–1.00 | 0.20–0.60 | Below 0.10 | 0.02–0.06 |

The material composing the coiled expander used in the present invention is the JIS Standard SWRS 2A, the components of which are as shown below:

| | |
|---|---|
| C | 0.75–0.85 |
| Si | 0.12–0.32 |
| Mn | 0.3–0.6 |
| P | Below 0.025 |
| S | Below 0.030 |
| Cu | Below 0.20 |

What is claimed:

1. An oil scraping ring combined with a coiled expander comprising an oil scraping ring provided with a plurality of circumferentially spaced oil-intake openings and a coiled expander mounted in contact with an inner peripheral groove at the back of said oil ring, characterized in that chrome plating is applied on the sliding face of said oil scraping ring and the inner peripheral groove at the back of said ring, that thermoplastic or thermo-setting resin is coated over the external surface of said sliding face and the inner walls of said oil-intake openings, and that chrome plating is applied over the entire peripheral surface of the coiled expander and the external surface thereof is further coated with said resin.

2. An oil scraping ring combined with a coiled expander according to claim 1, in which the inner wall of each oil-intake opening coated with said thermoplastic or thermo-setting resin comprises a lower part of the jaw, a stepped portion and an inner portion.

3. An oil scraping ring combined with a coiled expander according to claim 2, in which said inner portion is slightly tapered off inwardly.

4. An oil scraping ring combined with a coiled expander according to claim 3, in which the inclination at which said inner portion is tapered off inwardly is about 10 degrees.

5. An oil scraping ring according to claim 1, in which the thickness of chrome plating on the sliding face of said oil ring is 0.03 to 0.15 mm.

6. An oil scraping ring according to claim 1, in which the thickness of chrome plating on the periphery of the inner circumferential groove at the back of said ring is 0.002 to 0.03 mm.

7. An oil scraping ring according to claim 1, in which the surface of the chrome plating layer on the sliding face of said oil ring, and the surfaces of the lower part of the jaw of each oil-intake opening, of the stepped portion and of the inner portion are coated with a polytetrafluoroethylene coating of 0.002 to 0.01 mm. in thickness.

8. An oil scraping ring according to claim 1, in which said coiled expander has its peripheral face coated with a chrome plating layer of 0.01 to 0.05 mm. in thickness and the external surface thereof is in turn coated with a polytetrafluoroethylene coating of 0.002 to 0.01 mm. in thickness.

References Cited

UNITED STATES PATENTS

| | | | |
|---|---|---|---|
| 2,848,288 | 8/1958 | Johnson | 277—163 |
| 3,066,943 | 12/1962 | Brenneke | 277—139 |
| 3,323,807 | 6/1967 | Vanderbilt | 277—140 |

LOUIS K. RIMRODT, Primary Examiner

U.S. Cl. X.R.

277—163